United States Patent
Ohmi et al.

(10) Patent No.: US 7,595,087 B2
(45) Date of Patent: Sep. 29, 2009

(54) PROCESS OF FORMING PLATINUM COATING CATALYST LAYER IN MOISTURE-GENERATING REACTOR

(75) Inventors: Tadahiro Ohmi, 1-17-301, Komegahukuro 2-chome, Aoba-ku, Sendai-shi (JP) 980-0813; Nobukazu Ikeda, Osaka (JP); Akihiro Morimoto, Osaka (JP); Masafumi Kitano, Osaka (JP); Yukio Minami, Osaka (JP); Koji Kawada, Osaka (JP)

(73) Assignees: Fujikin Incorporated, Osaka (JP); Tadahiro Ohmi, Miyagi (JP)

( * ) Notice: Subject to any disclaimer, the term of this patent is extended or adjusted under 35 U.S.C. 154(b) by 733 days.

(21) Appl. No.: 10/510,758

(22) PCT Filed: Oct. 14, 2003

(86) PCT No.: PCT/JP03/13146

§ 371 (c)(1),
(2), (4) Date: Oct. 12, 2004

(87) PCT Pub. No.: WO2004/035209

PCT Pub. Date: Apr. 29, 2004

(65) Prior Publication Data

US 2005/0157834 A1  Jul. 21, 2005

(30) Foreign Application Priority Data

Oct. 16, 2002  (JP)  .............................. 2002-301423

(51) Int. Cl.
*G21C 9/00* (2006.01)

(52) U.S. Cl. ...................................... 427/239; 376/305

(58) Field of Classification Search .................. 427/239
See application file for complete search history.

(56) References Cited

U.S. PATENT DOCUMENTS 4,086,085 A * 4/1978 McGurty ..................... 420/43
5,069,938 A * 12/1991 Lorimer et al. ........ 427/255.26

(Continued)

FOREIGN PATENT DOCUMENTS

EP  390321 A1 * 10/1990

(Continued)

OTHER PUBLICATIONS

R Prescott and MJ Graham, The Oxidation of Iron-Aluminum Alloys, 1992, Oxidation of Metals, vol. 38, No. 1/2, p. 73-87.*

(Continued)

*Primary Examiner*—Michael Barr
*Assistant Examiner*—Ryan Schiro

(57) ABSTRACT

A barrier film which has uniform thickness and excellent adhesiveness to the base material and superbly functions to protect a platinum film can be formed on the inner wall surface of a moisture-generating reactor at ease and at a low cost. The moisture-generating reactor in which hydrogen and oxygen are reacted to generate moisture without high temperature combustion is made of an alloy containing aluminum. A principally aluminum oxide ($Al_2O_3$)-composed barrier film is formed by applying an aluminum selective oxidation treatment on the inner wall surface of the moisture-generating reactor, and thereafter a platinum film is stacked on and stuck to the barrier film so that a platinum coating catalyst layer is formed.

7 Claims, 3 Drawing Sheets

U.S. PATENT DOCUMENTS 5,301,217 A    4/1994    Heck et al.

FOREIGN PATENT DOCUMENTS

| | | | |
|---|---|---|---|
| EP | 390321 | A1 * | 10/1990 |
| EP | 1238942 | A1 * | 9/2002 |
| EP | 1238942 | A1 * | 9/2002 |
| JP | 2000-169109 | | 6/2000 |

OTHER PUBLICATIONS

RE Grace and AU Seybolt, Selective Oxidation of Al from and Al-Fe Alloy, Oct. 1958, Journal of the Electrochemical Society, vol. 105, No. 10, p. 582-585.*

* cited by examiner

F I G. 1
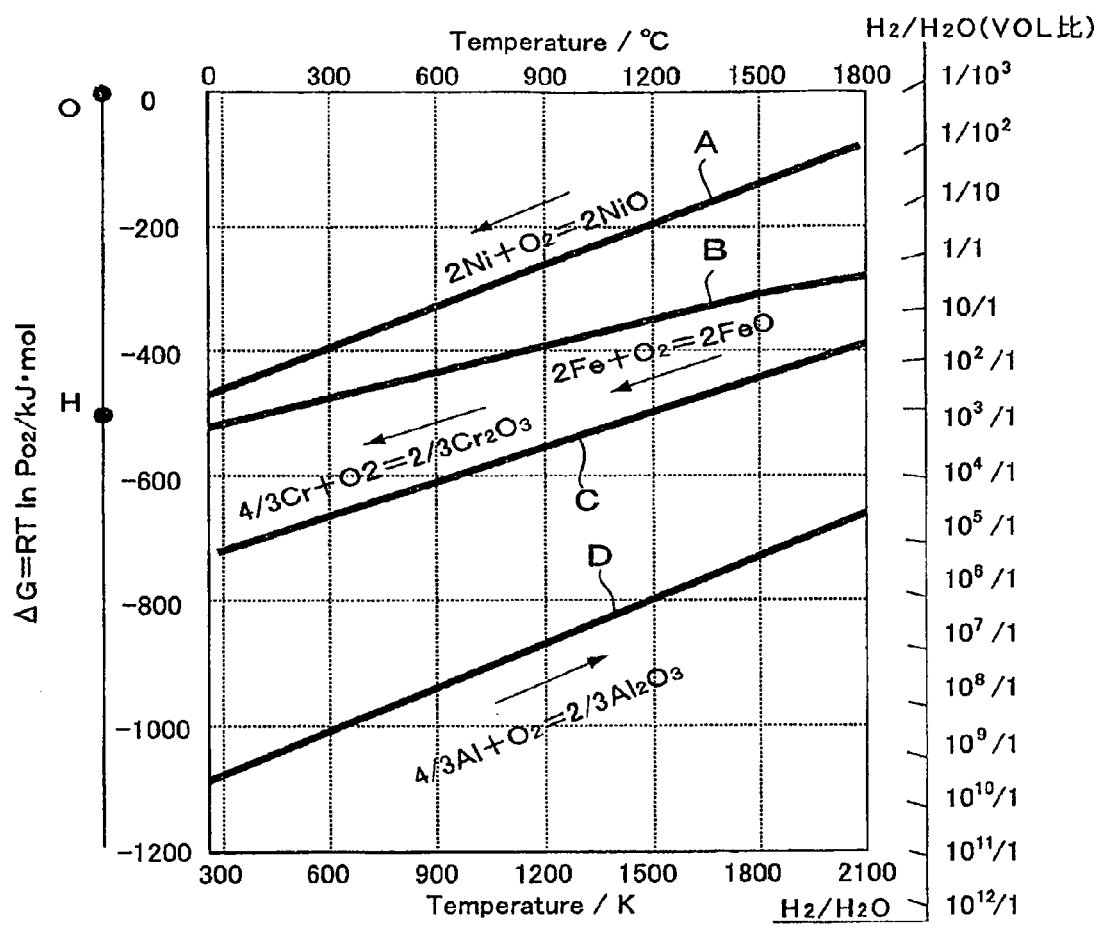

PROCESS OF FORMING PLATINUM COATING CATALYST LAYER IN MOISTURE-GENERATING REACTOR

This is a National Phase Application in the United States of International Patent Application No. PCT/JP2003/013146 filed Oct. 14, 2003, which claims priority on Japanese Patent Application No. 2002-301423, filed Oct. 16, 2002. The entire disclosures of the above patent applications are hereby incorporated by reference.

FIELD OF THE INVENTION

The present invention is primarily concerned with improvements in the method of manufacturing a moisture-generating reactor used in semiconductor manufacturing facilities and chemical manufacturing facilities. More particularly, the present invention is concerned with the process of forming a barrier film which constitutes a platinum catalyst layer formed on the inner wall surface of a reaction space inside the reactor.

BACKGROUND OF THE INVENTION

For example, for affixing a silicon oxide film by means of a water oxidation method in semiconductor manufacturing, continuous supply of ultra-high purity water is required. Consequently, the inventors of the present invention have developed a moisture-generating reactor as shown in FIG. 3 and disclosed it (see TOKU-KAI No. 2000-169109 and others).

The moisture-generating reactor is made by welding together reactor body parts 22, 23 which are placed opposite to each other so that a reactor body having a reaction space P inside is formed. The reactor body is provided with a material gas inlet 24, a moisture gas outlet 25, an inlet side reflector 26, an outlet side reflector 27 and others, and has a platinum coating catalyst layer 28 on the inner wall surface of the reactor body part 23 on the side opposite to the material gas inlet 24.

More specifically, the afore-mentioned platinum coating catalyst layer 28 is formed on the whole area of the inner surface of the reactor body part 23 made of SUS316L on the side of the moisture gas outlet 25. After a TiN-made barrier film 28a has been formed on the inner surface of the reaction body part 23, a platinum film 28b is formed thereon.

The thickness of the afore-mentioned barrier film 28a is most preferably 0.1 µm to 5 µm. In the figure, the TiN barrier film 28a with a thickness of about 5 µm is formed with an ion plating method.

Furthermore, a thickness of the afore-mentioned platinum film 28b is preferably 0.1 µm to 3 µm, and in the figure, the platinum film 28b of about 3 µm thick is formed by the vacuum vapor deposition method.

As methods to form the barrier film 28a, in addition to the afore-mentioned ion plating method, it is possible to employ an ion sputtering method, a PVD method such a vacuum vapor deposition method and the like, a chemical vapor deposition method (CVD method), a hot press method, a flame spray method and the like. As methods to form the platinum film 28b, in addition to the afore-mentioned vacuum vapor deposition method, it is possible to employ an ion plating method, an ion sputtering method, a chemical vapor deposition method, a hot press method and the like. In addition, if the barrier film 28a is made of an electrically conductive material such as TiN and the like, a plating method may be employed too.

The afore-mentioned barrier film 28a is formed to prevent the lowering of the reaction rate of the platinum film 28b occurring with the passage of time.

Namely, as the temperature of a stainless steel base material rises due to the reaction heat at the time of generating moisture, Ni and Fe diffuse from the metal base material to the inside of the platinum film 28b. Ni and Fe as diffused are oxidized on the platinum film 28b in an oxidation atmosphere, thus making the platinum film 28b lose its catalytic activity.

To prevent Fe and Ni from diffusing from the metal base material into the platinum film 28b, the afore-mentioned barrier film 28a is formed on the surface of the stainless steel (base material).

For the afore-mentioned barrier film 28a, materials not containing the elements such as Ni and Fe, and not producing oxides in the platinum coating film are most preferred. It has been found that in addition to the afore-mentioned TiN, not only TiAlN, TiC, TiCN and $Al_2O_3$ but also oxides and nitrides such as $Cr_2O_3$, $SiO_2$, SrN and the like may be used for the barrier film 28a.

Referring to FIG. 3, hydrogen and oxygen supplied through the material gas inlet 24 into the reactor body are diffused by a diffusing member comprising an inlet side reflector 26 and an outlet side reflector 27, and brought into contact with the platinum coating catalyst layer 28. When hydrogen and oxygen are brought into contact with the platinum coating catalyst layer 28, reactivity of hydrogen and oxygen is raised due to the catalytic action of the platinum such that hydrogen and oxygen are brought in a so-called radicalized state. The radicalized hydrogen and oxygen instantly react at the temperature (about 300° C.~400° C.) lower than the combustion temperature of a hydrogen mixture gas such that moisture is produced without the high temperature combustion.

Generated moisture (moisture gas) is guided outside through the moisture gas outlet 25 and supplied to a semiconductor manufacturing chamber and the like (not illustrated).

DESCRIPTION OF THE PRIOR ART

A moisture-generating reactor having a construction as illustrated in the afore-mentioned FIG. 3 is permitted to make $O_2$ and $H_2$ react safely with a reaction rate of almost 100% and without high temperature combustion, and continuously produce a required amount of moisture gas of ultra-high purity, thus achieving excellent, practical effects.

However, there remain some problems to solve in the above mentioned moisture-generating reactor. One of the problems is concerned with the formation of the barrier film 28a which constitutes a part of the afore-mentioned platinum coating catalyst layer 28.

That is, with the conventional moisture-generating reactor, the barrier film 28a with thickness of 1~5 µm is formed by means of an ion plating method, an ion sputtering method, a vacuum deposition method and the like. But, it is difficult to form the barrier film 28a of uniform thickness such that the barrier film 28a tends to have patches of a different thickness. In addition, there may be another problem such as pin holes formed on the barrier film 28a.

It will become more difficult to form a barrier film 28a with a uniform thickness on the inner wall surface of the reactor body part 23 especially when an outlet side reflector 27 provided on the inner wall surface of the reactor body part 23 is complicated in form.

Furthermore, it is quite costly to form the barrier film 28a, thereby making it difficult to reduce the manufacturing cost of the water-generating reactor.

In addition, since adherence between the barrier film 28a and the reactor body part 23 tends to be somewhat poor, there occurs so-called floating (i.e. separation) of the barrier film 28a when a heat cycle is applied.

OBJECT OF THE INVENTION

The present invention is aimed to solve the afore-mentioned problems of the conventional moisture generating reactor—that is (1) it is difficult to form the barrier film with a uniform thickness and with no pin holes on the inner wall surface in the reaction space; (2) it is difficult to reduce the cost for forming the barrier film; and (3) adherence of the barrier film to the base material is somewhat poor. The present invention provides a method to form a platinum coating catalyst layer in the moisture-generating reactor wherein a stainless steel alloy containing Al is heat-treated for a prescribed time and at the prescribed temperature in an inert gas with the prescribed ratio of hydrogen and water ($H_2/H_2O$), thereby making it possible to manufacture, using a so-called selective oxidation characteristic of the stainless alloy, the barrier film comprising an almost 100% $Al_2O_3$ layer and a principally $Al_2O_3$ composed layer (i.e. a layer composed of principally $Al_2O_3$) on the outer surface of the stainless steel alloy containing Al at an extremely low cost.

DISCLOSURE OF THE INVENTION

The present invention as described in a first embodiment has a basic construction in which a moisture-generating reactor having a platinum coating catalyst layer on the inner wall surface in the reaction space is formed, hydrogen and oxygen supplied into the reaction space are brought into contact with the platinum coating catalyst layer and radicalized thereby, and the radicalized hydrogen and oxygen are reacted to generate moisture without the high temperature combustion wherein the moisture-generating reactor is made of an alloy containing aluminum, a principally aluminum oxide ($Al_2O_3$)-composed barrier film is formed by applying an aluminum selective oxidation treatment on the inner wall surface of the moisture-generating reactor, and thereafter a platinum layer is stacked on and affixed to the barrier film so that a platinum coating catalyst layer is formed.

A second embodiment relates to a process of forming a platinum coating catalyst layer as described in the first embodiment wherein a stainless steel alloy containing aluminum is employed for an alloy containing aluminum.

A third embodiment relates to a process of forming a platinum catalyst layer as described in the first embodiment wherein the aluminum selective oxidation treatment is effected on the alloy containing aluminum by heating for a prescribed time under the conditions where the hydrogen-to-water ($H_2/H_2O$) ratio in a treatment atmosphere is $10^4/1 \sim 10^9/1$ and the heating temperature is $300°$ C.$\sim 1500°$ C.

A fourth embodiment relates to a process of forming a platinum coating catalyst layer as described in the first embodiment wherein the platinum coating catalyst layer is formed on the inner wall surface of only a reactor body part on the moisture gas outlet side of the moisture generating reactor.

A fifth embodiment relates to a process of forming a platinum coating catalyst layer as described in the first embodiment wherein the barrier film which forms part of the platinum coating catalyst layer comprises an almost 100% aluminum oxide ($Al_2O_3$) layer on the inner wall surface of the base material and a principally aluminum oxide ($Al_2O_3$)-composed layer on the outside thereof.

A sixth embodiment relates to a process of forming a platinum coating catalyst layer as described in the second embodiment wherein an austenitic alloy containing aluminum having chemical components of Cr 17.7 wt %, Ni 25.5 wt %, Mo 0.01 wt %, Mn not more than 0.01 wt %, Al 3~4 wt %, C not more than 0.01 wt %, S not more than 0.01 wt %, P not more than 0.01 wt % and Fe the remainder is employed for the alloy containing aluminum.

A seventh embodiment relates to a process of forming a platinum coating catalyst layer as described in the third embodiment wherein the heating treatment is effected at the temperature of 800° C. for 3 hours in the treatment atmosphere of an argon gas containing 10 VOL % hydrogen and 10 ppm water.

BRIEF DESCRIPTION OF THE DRAWINGS

FIG. 1 is a diagram (the Ellingham diagram) showing the relation between the temperature and atmosphere ($H_2/H_2O$) at the oxidation of major elements in the stainless alloy containing aluminum.

LIST OF REFERENCE CHARACTERS AND NUMERALS

P designates a reaction space, 22 a reactor body part, 23 a reactor body part, 24 a material gas inlet, 25 a moisture gas outlet, 26 an inlet side reflector, 27 an outlet side reflector, 28 a platinum coating catalyst layer, 28a a barrier film, 28b a platinum film and 29 a filter.

MODE OF CARRYING OUT THE INVENTION

FIG. 1 is the Ellingham diagram showing the relation between $H_2/H_2O$ and the temperature in the oxidation of each of the elements (Ni, Fe, Cr and Al) contained in the stainless steel alloy containing Al to be employed in the present invention. A curve A shows the oxidation of Ni, B the oxidation of Fe, C the oxidation of Cr and D the oxidation of Al.

As apparent from FIG. 1, it is possible to selectively oxidize only Al out of the elements Ni, Fe, Cr and Al by setting the value of $H_2/H_2O$ (Vol ratio) in the oxidizing atmosphere and the temperature in the proper ranges. For example, only aluminum can be selectively oxidized in the temperature range of 300° C.~1500° C. when the $H_2/H_2O$ ratio (vol ratio) is $10^4/1 \sim 10^9/1$.

For example, when only Al out of Ni, Fe, Cr and Al is to be selectively oxidized by setting the $H_2/H_2O$ ratio value and temperature in the proper ranges, the oxidation of Al is expressed as below:

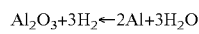

Also, Ni, Fe, and Cr oxides (NiO, $Fe_2O_3$, $Cr_2O_3$) are reduced as below:

$$NiO+H_2 \rightarrow Ni+H_2O$$

$$Fe_2O_3+3H_2 \rightarrow 2Fe+3H_2O$$

$$Cr_2O_3+3H_2 \rightarrow 2Cr+3H_2O$$

The present invention relates to the forming of the barrier film L comprising a 100% $Al_2O_3$ layer and a principally $Al_2O_3$ composed layer on the inner surface of the reactor body parts 22, 23 where the Al selective oxidation characteristic is utilized to oxidize Al alone on the inner surface of the reactor body parts 22, 23 made of a stainless alloy containing Al.

Embodiment

Figure 2:
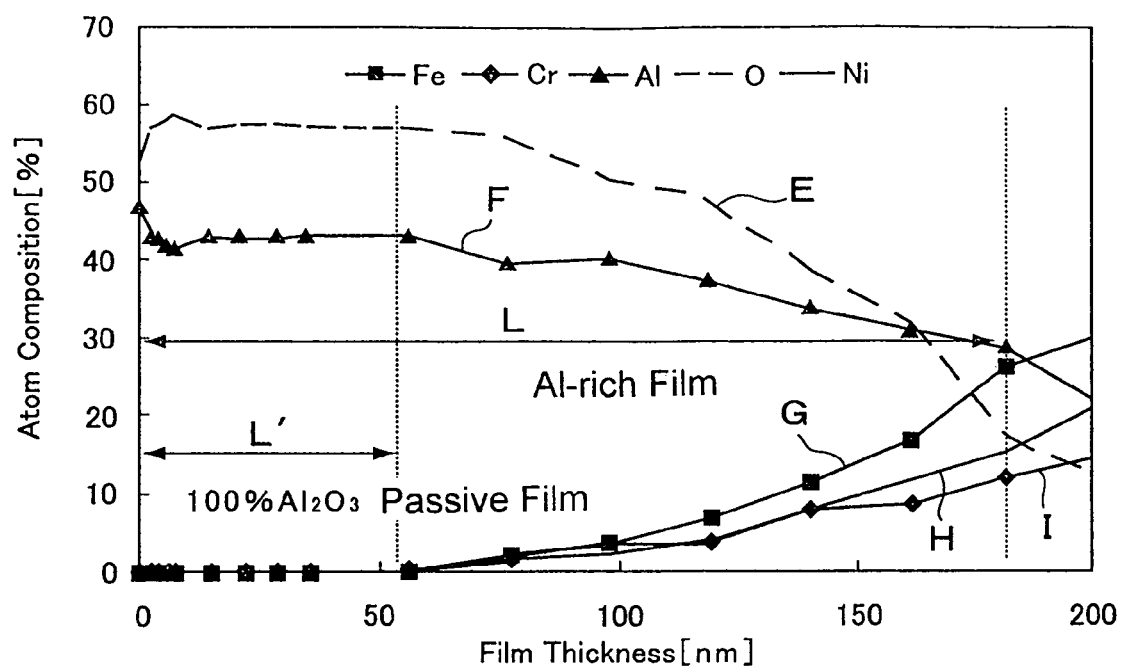
FIG. 2 is an atom composition graph of the $Al_2O_3$ film formed by applying the Al selective oxidation treatment on the surface of the stainless steel alloy containing aluminum (FR31).
Figure 3:
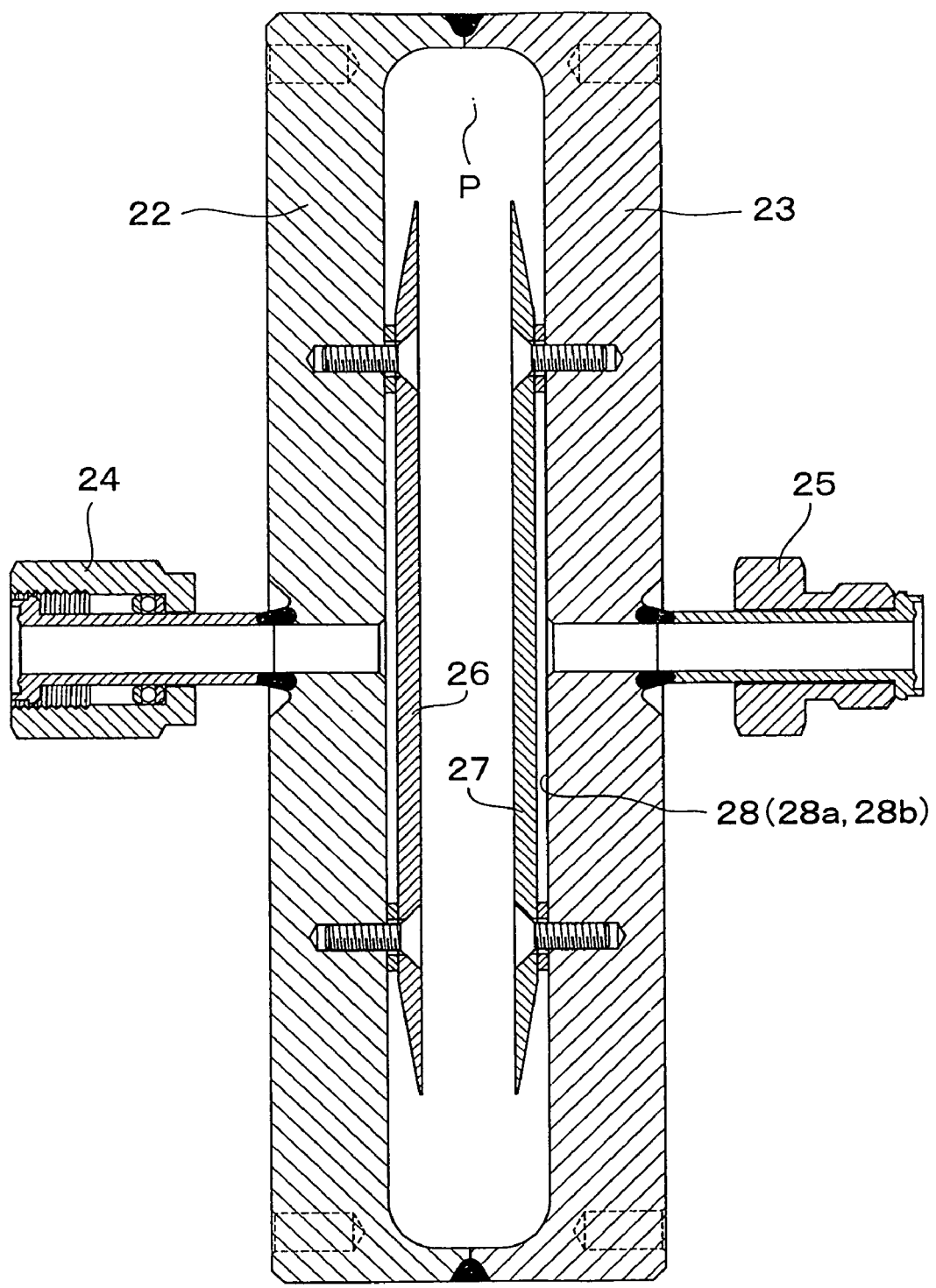
FIG. 3 is a sectional schematic illustration of the conventional moisture generating reactor (TOKU-KAI No. 2000-169109).

A stainless steel alloy containing Al (HR31) having a chemical composition (wt %) listed at the upper section in Table 1 given below was used to produce the reactor body parts 22, 23 with an outside diameter of 110 mm in a shape as shown in FIGS. 2 and 3. The lower section in Table 1 is for the conventional stainless steel (SUS316L).

TABLE 1

| | | Chemical Composition (wt %) | | | | | | | |
|---|---|---|---|---|---|---|---|---|---|
| | Fe | Cr | Ni | Mo | Mn | Al | C | S | P |
| Austenitic HR31 | remainder | 17.7 | 25.5 | 0.01 | <0.01 | 3~4 | <0.01 | <0.01 | <0.01 |
| Austenitic SUS316L | remainder | 17.2 | 15.1 | 2.76 | <0.01 | <0.01 | <0.01 | <0.01 | <0.01 |

The pre-treatment step such as cleaning was applied on the inner surface of the reactor body part 23 made of the afore-mentioned Stainless steel alloy containing Al. After the inner surface was cleaned, the reactor body part 23 was placed in the heat treatment furnace and heat-treated under the under-mentioned conditions.

Conditions of Al Selective Oxidation

Ar gas containing 10% of $H_2$ and 10 ppm of $H_2O$ is flowed into the heat treatment furnace (the inner volume of about 1 liter) at the flow rate of 1 liter/min, and the heat treatment was applied in the heat treatment furnace for about 3 hours while maintaining the temperature of the heat treatment furnace at about 800° C.

FIG. 2 is a depth profile (the result of the depth direction analysis) using the ESCA. The figure shows the element composition inside the $Al_2O_3$ film formed on the inner surface of the reactor body part 23 by means of the afore-mentioned Al selective oxidation treatment. Referring to FIG. 2, the curve E shows the atom number ratio (%) of Oxygen O, F the atom number (%) of Al, G the atom number (%) of Fe, H the atom number (%) of Ni, and I the atom number (%) of Cr. As apparent from FIG. 2, the so-called Al-rich layer is formed in the range L within about 180 nm (0.18 μm) from the inner side surface (adjacent the base material) of the $Al_2O_3$ film, and entirely $Al_2O_3$ composed layer is formed in the range L' within about 50 nm (0.05 μm) from the inner side surface.

According to embodiments of the present invention, the reactor body parts 22, 23 are made of A stainless steel alloy containing Al. The afore-mentioned Al selective oxidation treatment is applied on the inner wall surfaces of the reactor body parts to form the barrier film L which is composed of principally $Al_2O_3$. Then, a platinum film 28b is stacked on and affixed to the afore-mentioned barrier film L on the inner wall surface of the reactor body part 23 on the moisture gas outlet side such that the moisture generating reactor is formed by placing the afore-mentioned reactor body part 23 and the reactor body part 22 on the material gas inlet 24 side opposite to each other, and welding together their opposing outer peripheral surfaces where they contact.

According to the moisture generating test conducted using the moisture-generating reactor formed in accordance with this embodiment, it has been confirmed that in regard to the change of reactivity with the passage of time, adhesiveness (mechanical strength) of the platinum coating catalyst layer 28 and the likes, the moisture-generating reactor according to the present embodiment is never inferior to the conventional moisture generating reactor having a TiN barrier film 28a formed by the ion plating method.

According to the afore-mentioned embodiment, the reactor body parts 22, 23 are made of stainless steel alloy containing Al (austenite HR 31). However, it will be understood that any kind of material can be used as long as it is an alloy containing Al.

Furthermore, according to this embodiment, about 0.18 μm thick layer L composed of principally $Al_2O_3$, which is provided with a 0.05 μm thick 100% (entirely) $Al_2O_3$ layer L', is formed on the outer surface of the stainless steel alloy containing Al (the base material S) to serve as the barrier film L. However, the thickness of the said $Al_2O_3$ layer L' and the principally $Al_2O_3$ composed layer L can be appropriately chosen by changing the conditions of the oxidation treatment in the Al selective oxidation.

In addition, according to this embodiment, the barrier film L is formed on both the reactor body parts 22, 23. However, the barrier film L can be formed on the inner wall surface of only the reactor body part 23 on the side of the moisture gas outlet 25.

EFFECTS OF THE INVENTION

According to embodiments of the present invention, reactor body parts of the moisture-generating reactor are made of an alloy containing Al, and a principally $Al_2O_3$-composed barrier film is formed on the inner wall surface of the reactor body parts by applying an Al selective oxidation treatment thereon. Further, a platinum film is stacked on and affixed to the barrier film to form a platinum coating catalyst layer.

As a result, in comparison with the case where the barrier film is formed by the conventional ion plating method or ion sputtering method and the like, the principally $Al_2O_3$-composed barrier film with uniform thickness can be formed at ease and at a low cost, thus making it possible to substantially reduce the manufacturing cost of the moisture-generating reactor.

The principally $Al_2O_3$-composed barrier film formed by the afore-mentioned Al selective oxidation is provided with excellent mechanical strength such as strong adhesiveness to the base material, and, at the same time, it functions superbly to block the invasion of atoms constituting the base material into the platinum film, thus ensuring a remarkably long service life of the platinum coating catalyst layer.

Thus, embodiments of the present invention achieve excellent, practical effects.

The invention claimed is:

1. A process of forming a platinum coating catalyst layer in a moisture-generating reactor, comprising the steps of:
   (a) providing a reactor body part made of an alloy containing aluminum;
   (b) forming a principally aluminum oxide ($Al_2O_3$)-composed barrier film on an inner wall surface of the reactor body part by applying an aluminum selective oxidation treatment; and
   (c) applying a platinum layer to the barrier film to form the platinum coating catalyst layer, wherein a stainless steel alloy containing aluminum is employed for the alloy containing aluminum and wherein the aluminum selective oxidation treatment of the alloy containing aluminum is effected by a heating treatment comprising the steps of
      i. heating for a prescribed time, and
      ii. providing a treatment atmosphere comprising a ratio of hydrogen-to-moisture ($H_2/H_2O$) of $10^4$:1 to $10^9$:1 and a heating temperature of 300° C. to 1500° C.,
   wherein the barrier film which forms part of the platinum coating catalyst layer comprises an almost 100% aluminum oxide ($Al_2O_3$) layer on the alloy containing aluminum forming the inner wall surface of the reactor body part and a principally aluminum oxide ($Al_2O_3$)-composed layer on at least some of the alloy containing aluminum forming an outer surface of the reactor body part.

2. A process of forming the platinum coating catalyst layer in the moisture-generating reactor as claimed in claim 1, wherein the platinum coating catalyst layer is formed on the inner wall surface of only the reactor body part comprising a moisture gas outlet side of the moisture-generating reactor.

3. A process of forming the platinum coating catalyst layer in the moisture-generating reactor as claimed in claim 1, wherein the stainless steel alloy containing aluminum is an austenitic alloy comprising 17.7 wt % of Cr, 25.5 wt % of Ni, 0.01 wt % of Mo, not more than 0.01 wt % of Mn, 3 to 4 wt % of Al, not more than 0.01 wt % of C, not more than 0.01 wt % of S, not more than 0.01 wt % of P, and the remaining % of Fe is employed for an aluminum containing alloy.

4. A process of forming the platinum coating catalyst layer in the moisture-generating reactor as claimed in claim 1, wherein the heating temperature is 800° C., the prescribed time is 3 hours, and the treatment atmosphere comprises argon gas containing 10 VOL % hydrogen and 10 ppm $H_2O$.

5. A process of forming the platinum coating catalyst layer in the moisture-generating reactor as claimed in claim 1, wherein the stainless steel alloy containing aluminum comprises nickel.

6. A process of forming the platinum coating catalyst layer in the moisture-generating reactor as claimed in claim 1, wherein the stainless steel alloy containing aluminum comprises nickel, iron, chromium, and aluminum.

7. A process of forming the platinum coating catalyst layer in the moisture-generating reactor as claimed in claim 1, wherein the stainless steel alloy containing aluminum is an austenitic alloy comprising 17.7 wt % of Cr, 25.5 wt % of Ni, and 3 to 4 wt % of Al.

* * * * *